(12) United States Patent
Le Roy-Delage et al.

(10) Patent No.: US 6,742,592 B1
(45) Date of Patent: *Jun. 1, 2004

(54) CEMENTING COMPOSITIONS AND APPLICATIONS OF SUCH COMPOSITIONS FOR CEMENTING OIL WELLS OR THE LIKE

(75) Inventors: Sylvaine Le Roy-Delage, Paris (FR); Marc Thiercelin, Ville d'Avray (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/089,832
(22) PCT Filed: Sep. 19, 2000
(86) PCT No.: PCT/EP00/09203
§ 371 (c)(1), (2), (4) Date: Aug. 12, 2002
(87) PCT Pub. No.: WO01/25163
PCT Pub. Date: Apr. 12, 2001

(30) Foreign Application Priority Data

Oct. 7, 1999 (FR) ........................................... 99 12661

(51) Int. Cl.$^7$ .............................................. E21B 33/13
(52) U.S. Cl. ...................................................... 166/293
(58) Field of Search ........................... 166/293; 106/724

(56) References Cited

U.S. PATENT DOCUMENTS 6,176,314 B1 * 1/2001 Stephens ..................... 166/293

* cited by examiner

Primary Examiner—Paul Marcantoni
(74) Attorney, Agent, or Firm—Stephen Schlather; Thomas O. Mitchell; Robin Nava

(57) ABSTRACT

The present invention provides cementing compositions for an oil well or the like, comprising an hydraulic binder, dense particles with a density higher than the density of the hydraulic binder, and reinforcing particles with a density of less than 1.5 g/cm$^3$, preferably less than 1.2 g/cm$^3$, constituted by a flexible material or rubber, of low compressibility and with an average grain size of less than 600 μm. The compositions of the invention are of particular advantage when preventing zones which are subjected to extreme stresses, such as perforation zones and the junctions of a multi-branch lateral well. They are also highly suitable for producing plugs.

16 Claims, No Drawings

CEMENTING COMPOSITIONS AND APPLICATIONS OF SUCH COMPOSITIONS FOR CEMENTING OIL WELLS OR THE LIKE

The present invention relates to techniques for drilling oil, gas, water, or geothermal wells or the like. More precisely, the invention relates to cementing compositions which are particularly suitable for cementing zones which are subjected to extreme static or dynamic stresses.

In general, a well which is over a few hundred meters deep is cased and the annular space between the underground formation and the casing is cemented over all or part of its depth. Cementing essentially prevents the exchange of fluid between the different layers of formation traversed by the hole and controls the ingress of fluid into the well, and in particular limits the ingress of water. In production zones, the casing—and the cement and the formation—are perforated over a height of several centimeters.

The cement placed in the annular space of an oil well is subjected to a number of stresses throughout the lifetime of the well. The pressure inside a casing can increase or decrease because the fluid which fills it can change or because additional pressure is applied to the well, for example when the drilling fluid is replaced by a completion fluid, or during a stimulation operation. A change in temperature also creates stress in the cement, at least during the transition period before the steel and the cement reach temperature equilibrium. In the majority of the above cases, the stress process is sufficiently slow for it to be treated as a static process; and in some cases the forces can be sufficiently large to damage the casing. The cement is also subjected to other stresses which are dynamic in nature, either because they are produced over a very short period or because they are either periodic or repetitive in nature. Perforating creates an over-pressure of several hundred bars inside a well which is dissipated in the form of a shock wave. Further, perforating creates a shock when the projectile penetrates the cement and that shock subjects the zone surrounding the hole to large forces over a depth of several meters.

A further process, which is now routine in oil well, operations and which creates dynamic stresses in the cement, is the opening of a window in a casing which is already cemented to create a multi-branch lateral well. Milling the steel over a depth of several meters followed by drilling a lateral well subjects the cement to shocks and vibrations which usually damage it irreparably.

The present invention aims to provide novel formulations, in particular for cementing regions of oil wells or the like which are subjected to extreme static or dynamic stresses.

An article presented at the SPE (Society of Petroleum Engineers) annual technical conference and exhibition of 1997, Marc Thiercelin et al. (SPE 38598, 5–8 Oct. 1997)—and French patent application. FR-A 97 11821 of $23^{rd}$ Sep. 1997—demonstrate that the risk of rupture of a cement sleeve depends on the thermoelastic properties of the casing, of the cement, and of the formation surrounding the well. A detailed analysis of the mechanisms leading to rupture of the cement sleeve has shown that the risk of rupture of a cement sleeve following an increase in pressure and/or temperature in the well is directly linked to the tensile strength of the cement and is attenuated when the ratio of the tensile strength $R_T$ of the cement to its Young's modulus E is increased.

Young's modulus is known to characterize the flexibility of a material. To increase that $R_T/E$ ratio, it is advantageous to select materials with a low Young's modulus, in other words to select very flexible materials.

One known means for increasing the flexibility of a hardened cement is to reduce the density of the slurry by extending it with water. However, that leads to the stability of the slurry being degraded, in particular with the solid and liquid phases separating. Such phenomena can, of course, be controlled in part by adding materials such as sodium silicate, but the permeability of the hardened cement is nevertheless very high, which means that it cannot fulfill its primary function of isolating zones to prevent fluid migration, or at least it cannot guarantee its long-term isolation. Furthermore, lightened cements have lower strength, in particular lower shock resistance, which constitutes a clear handicap for cements intended for use in zones which are subjected to extreme mechanical stresses such as perforation zones.

In the building field, incorporating particles of rubber into a concrete is known to result in better toughness, durability and elasticity [see, for example, A. B. Sinouci, Rubber-Tire Particles as Concrete Aggregate, Journal of Materials in Civil Engineering, 5, 4, 478–497 (1993)]. Concretes which include rubber particles in their formulation can be used, for example, in highway construction to absorb shocks, in anti-noise walls as a sound insulator, and also in constructing buildings to absorb seismic waves during earthquakes. In such applications, the mechanical properties in particular are improved.

In the field of oil well cementing, it is also known [Well Cementing 1990, E. B. Nelson, Schlumberger Educational Services] that adding ground rubber particles (with a grain size in the range 4–20 mesh) can improve impact strength and bending strength. Such an improvement in mechanical properties has also been indicated in patent publications SU-1384724 and SU-1323699. More recently, United States patent, U.S. Pat. No. 5,779,787 has proposed the use of particles derived from recycled automobile tires in a grain size in the range 10/20 or 20/30 mesh, to improve the mechanical properties of hardened cements, in particular to improve their elasticity and ductility.

In its French patent application number FR-A-98 16104 dated $21^{st}$ Dec. 1998, the Applicant describes lightened oil cements reinforced with flexible particles, of low compressibility, with low density, and with an average particle size not exceeding 500 micrometers ($\mu$m). The density of the flexible particles is less than 1.5 grams per cubic meter (g/cm$^3$), preferably less than 1.2 g/cm$^3$ and more preferably less than 1 g/cm$^3$. That results in lightened cement slurries. All of the examples given in French patent application FR-A-98 16104 correspond to a slurry with a density of less than 1.68 g/cm$^3$.

Further, in patent application FR-A-98 12538, the Applicant also describes cement slurries with a density of less than 1.70 g/cm$^3$ comprising 30% to 100% (by weight of cement) of rubber particles, with a grain size of 40–60 mesh with a diameter which is preferably in the range 250 $\mu$m to 400 $\mu$m.

As indicated above, a reduction in slurry density tends to encourage its flexibility and is thus usually desired. However, low density may not be desirable in particular when the pressure is high due to the formation or to the nature of other fluids pumped downstream or upstream of the lightened slurry.

The authors of the present invention have set themselves the target of producing cementing slurries reinforced by flexible or rubber particles with a low density, but with the density of the slurries themselves being normal for cementing slurries for oil wells or the like, i.e., typically in the range 1.7 g/cm$^3$ to 2.2 g/cm$^3$.

According to the invention, the problem is solved by cementing slurries for an oil well or the like comprising an hydraulic binder, dense particles with a density higher than the density of the hydraulic binder and reinforcing particles with a density of less than 1.5 g/cm$^3$, preferably less than 1.2 g/cm$^3$, constituted by a rubber or a flexible material, of low compressibility and with an average grain size of less than 600 micrometers ($\mu$m).

The flexible particles are constituted by a material with a Young's modulus of less than 5000 mega Pascals (MPa) (preferably less than 3000 MPa, more preferably less than 2000 MPa), i.e., the elasticity of these particles is at least four times greater than that of cement and more than thirteen times that of the silica usually used as an additive in oil well cements. The flexible particles added to the cementing compositions of the invention are also remarkable because of their low compressibility. Materials which are more compressible than rubbers, in particular with a Poisson ratio of less than 0.45, preferably less than 0.4, are preferred. However, materials which are too compressible, with a Poisson ratio of less than 0.3, are not preferred.

Preferred dense particles are particles with a specific gravity of well over 3, such as haematite particles which have a density of 4.95 g/cm$^3$.

The dense particles and reinforcing particles must be insoluble in an aqueous medium which may be saline, and they must be capable of resisting a hot basic medium since the pH of a cementing slurry is generally close to 13 and the temperature in a well is routinely higher than 100° C.

Regarding the size of the rubber or flexible particles, essentially isotropic particles are preferred. Spherical or near spherical particles may be synthesized directly, but usually the particles are obtained by grinding, in particular cryogrinding. The average particle size is generally in the range 80 $\mu$m to 600 $\mu$m, preferably in the range 100 $\mu$m to 500 $\mu$m. Particles which are too fine, also particles which are too coarse, are difficult to incorporate into the mixture or result in pasty slurries which are unsuitable for use in an oil well.

Particular examples of materials which satisfy the various criteria cited above are thermoplastics (polyamide, polypropylene, polyethylene, . . . ) or other polymers such as styrene divinylbenzene or styrene butadiene (SBR).

In addition to flexible particles and dense particles, the cementing compositions of the invention comprise an hydraulic binder, in general based on Portland cement and water. Depending on the specifications regarding the conditions for use, the cementing compositions can also be optimized by adding additives which are common to the majority of cementing compositions, such as suspension agents, dispersing agents, anti-foaming agents, expansion agents (for example magnesium oxide or a mixture of magnesium and calcium oxides), fine particles, fluid loss control agents, gas migration control agents, retarders or setting accelerators.

A typical composition of the invention comprise, by volume, 2% to 15% of dense particles, 5% to 20% of flexible particles, 20% to 45% of cement and 40% to 50% of mixing water.

The formulations of the invention are preferably based on Portland cements in classes A, B, C, G and R as defined in Section 10 of the American Petroleum Institute's (API) standards. Classes G and H Portland cements are particularly preferred but other cements which are known in this art can also be used to advantage. For low-temperature applications, aluminous cements and Portland/plaster mixtures (for deepwater wells, for example) or cement/silica mixtures (for wells where the temperature exceeds 120° C., for example) can be used, or cements obtained by mixing a Portland cement, slurry cements and/or fly ash.

The water used to constitute the slurry is preferably water with a low mineral content such as tap water. Other types of water, such as seawater, can possibly be used but this is generally not preferable.

These particles with low density with respect to the cement can affect the flexibility of the system, since adding flexible particles produces cements with a lower Young's modulus, while producing low permeability and better impact resistance.

The mechanical properties of the compositions comprising flexible particles of the invention are remarkable, rendering them particularly suitable for cementing in areas of an oil well which are subjected to extreme stresses, such as perforation zones, junctions for branches of a lateral well or plug formation.

The following examples illustrate the present invention.

Cement Slurry Formulations

Slurries were prepared based on an HMR cement resistant to magnesium salts and based on a Portland cement, furnace clinker and fly ash, polypropylene particles, haematite particles, water and different conventional additives such as a dispersing agent, a retarder and an anti-foaming agent.

The formulations and properties of the cement slurries are given in Tables 1 to 3; the density $\rho$ of the cement slurry was about 1.92 g/cm$^3$—(16 pounds per gallon—ppg) for all of the compositions. This illustrates a major characteristic of the invention which dissociates the density of the slurry from the flexible particle concentration.

ICO Polymer produced the polypropylene used in this example under the trade name ICORENE 9013 P. Its density was 0.905 g/cm$^3$. Its initial specification as regards grain size was such that the grain size of at most 5% of the particles is more than 800 $\mu$m, 30% with a grain size of more than 500 $\mu$m and less than 15% with a grain size of less than 200 $\mu$m.

The average dimension of the haematite particles was 50 $\mu$m.

Table 1 below shows the quantity of haematite and polypropylene added with respect to the weight of HMR cement and the proportion by volume (by volume of the HMR cement-haematite-propylene mixture, abbreviated to bvob, "by volume of blend").

The dispersing agent used was a polynaphthalene sulphonate; the retarder was a lignosulphonate. The expansion agent was magnesium oxide.

For the solid additives (the expansion agent and the fluid loss control agent), the proportions shown are with respect to the weight of HMR cement (abbreviated to bwoc, "by weight of cement"). For additives in the liquid form (anti-foaming agent, dispersing agent and retarder), the proportions are shown in gallons per sack (gps), i.e., 3.78541 liters per sack of 42.637 kilogram (kg) of HMR cement, in other words 1 gps=0.0888 liters (l) of additive per kg of HMR cement.

TABLE 1

Cement slurry formulation

| | Haematite | | Poly-propylene | | Expansion agent | Fluid loss control agent | Anti-foaming agent | Dispersing agent | Retarder |
|---|---|---|---|---|---|---|---|---|---|
| | % bwoc | % bvob | % bwoc | % bvob | | | | | |
| #1 | 11 | 5 | 6 | 15 | 2.34 | | 0.038 | 0.33 | 0.11 |
| #2 | 50 | 16.14 | 15.2 | 27 | 3.30 | | 0.054 | 0.155 | 0.155 |
| #3 | 100 | 23.54 | 27 | 35 | 4.54 | 0.45 | 0.075 | 0.213 | 0.213 |
| #4 | 50 | 16.14 | 15.2 | 27 | 2.15 | 0.33 | 0.054 | 0.155 | 0.116 |

TABLE 2

Slurry density and porosity

| Formulation | Density ppg | Density g/cm³ | Porosity |
|---|---|---|---|
| #1 | 16.16 | 1.936 | 46% |
| #2 | 16.17 | 1.938 | 46% |
| #3 | 16.22 | 1.944 | 46% |
| #4 | 16.11 | 1.930 | 46% |

The rheology of slurries #1 and #4 was measured using the procedure recommended in API 10 (American Petroleum Institute). At laboratory temperature, the rheology was measured immediately after mixing and after 20 minutes of conditioning to temperature. The results are shown in Table 3. The rheology of a slurry was characterized by its plastic viscosity PV (in cP or mPa.s), the conversion factor being equal to 1) and the yield point or Ty (in lbf/100 ft², conversion to Pascals being obtained by multiplying by 0.478803), assuming the slurry to be a Bingham fluid.

TABLE 3

Rheology

| | Rheology after mixing at laboratory temperature | | Rheology after conditioning at 85° C. | |
|---|---|---|---|---|
| Formulation | PV (mPa.s) | Ty (lbf/100 ft²) | PV (mPa.s) | Ty (lbf/100 ft²) |
| #1 | 226 | 9.3 | 86 | 9.4 |
| #2 | 117 | 6.2 | 42.6 | 6.8 |
| #3 | 131 | 8.5 | 68.5 | 9.1 |
| #4 | 198 | 12 | 131 | 19.7 |

These rheology measurements show that the slurry could be pumped in an oil type well.

For slurry #4, the stability was also checked by determining the density profile of a set cement column under pressure and temperature under static conditions. To this end after preparing, the slurry was cast into a cylindrical mold 20.32 cm high and 2.54 cm in diameter. The slurry was mixed and stirred for 20 minutes at 85° C. and cast into the mold which had been pre-heated to the same temperature. The temperature was increased by 2° C. per minute to the test temperature (120° C.). A pressure of 20.68 MPa was applied and maintained throughout the test (24 hours). At the end of the test, the density at the top and bottom of the column was measured. For slurry #4, a difference of 0.013 g/cm³ was determined between the top and bottom which indicated that the slurry was stable even when it contained a large quantity of haematite.

The development of the compressive strength during setting of the cement was evaluated by UCA (Ultrasonic Cement Analyzer) measurements. These measurements enabled the setting time required to produce a given strength (0.34 MPa=50 psi and 3.4 MPa=500 psi) and the compressive strength Rt obtained after a given time (24 and 48 hours), at a pressure of 3000 psi (20.7 MPa) to be determined.

TABLE 4

UCA and setting time at T = 120° C.

| N° | Setting time at 95° C. | Time to 0.34 MPa at T (h:min) | Time to 3.4 MPa at T (h:min) | Compressive strength after 24 hours (MPa) | Compressive strength after 48 hours (MPa) |
|---|---|---|---|---|---|
| #4 | 5:17 | 7:12 | 7:30 | 15 | 17.8 |

Mechanical Properties—Compression

The compressive mechanical properties were measured for certain prepared cement slurries.

The influence of adding haematite particles and flexible particles on the mechanical properties of a set cement was studied using systems which had passed several days under high pressure and temperature in high pressure and high temperature chambers to simulate the conditions encountered in an oil well.

The tests were carried out on cubes with 5 cm (2 inch) sides obtained after three days at 120° C. and at 20.7 MPa (3000 psi).

For comparison purposes, an NET system was formulated with no flexible particles and no haematite particles, with a density of 1.941 g/cm³ (16.2 ppg), a porosity of 48%, simply prepared with HMR type cement, an anti-foaming agent (0.04 gps) and a dispersing agent (0.02 gps). The results obtained with formulation C1 described in French patent application FR-A-98 16104 were also repeated, constituted by a mixture of class G cement, 19.4% (by weight of cement) of polypropylene particles, 0.022 gps of a dispersing agent, 0.045 gps of a retarder and 0.030 gps of an anti-foaming agent. The porosity of this formulation was 45% and its density was 1.67 g/cm³. The bending and compression tests were carried out on this formulation after 5 days.

The results are shown in Table 5 where Cs designates the compressive strength and Ec represents the compressive Young's modulus.

TABLE 5

Results of compressive tests with flexible particles.

| Formulation | CS (MPa) | Ec (MPa) | CS/Ec (×1000) | Energy (J) |
|---|---|---|---|---|
| NET | 39.2 | 9041.6 | 4.33 | 10.77 |
| C1 | 21.6 | 3977.2 | 5.49 | 14.28 |
| #1 | 35.5 | 6242.6 | 5.81 | 19.00 |
| #2 | 21.1 | 2594.1 | 8.17 | 19.25 |
| #3 | 13.4 | 1177.29 | 11.38 | 15.94 |

It can be seen that the compressive Young's modulus of the compositions of the invention decreased sharply with larger quantities of added polypropylene particles. A comparison of formulations C1 and #2, which comprise analogous quantities of polypropylene particles with respect to the cement also show that rather than opposing this decrease in Young's modulus, adding haematite particles contributes to it.

Measurement of Poisson Ratio

The Poisson ratio was measured for different formulations with flexible particles to evaluate the compressibility of these systems. The compositions of the different formulations were given in the preceding examples.

When a cement sample is subjected to a normal compressive force, while remaining within the elastic region of the material, the longitudinal fibers of the sample are shortened the amount of which depends on the Young's modulus of the material (and on the stress applied and on the geometry of the sample). Simultaneously, the transverse dimension of the sample is elongated. The ratio of the transverse deformation (variation relative to the transverse dimension) to the longitudinal deformation (longitudinal relative variation) is a dimensionless coefficient known as the Poisson ratio.

In our tests, the loading rate was 1 kN/min and the samples were cylindrical, with a diameter of 30 mm and a length of 60 mm. The longitudinal deformation was measured using LVDT type displacement gauges; the transverse deformation was measured using a strain gauge.

The samples were placed in a chamber filled with water for several days at 120° C. and at 3000 psi. These were the same aging conditions as those used to prepare the samples for the compression tests. After curing, the samples were kept permanently submerged and were simply drained before carrying out the mechanical tests which were thus carried out on the moist samples.

For formulation #4, the Poisson ratio of the hardened cement was measured at 0.239 for a density of 1.93 g/cm$^3$. For conventional cements with the same density, the Poisson ratio is between 0.15 and 0.2. This indicates that the compressibility of the cements of the invention is lower. Because of this lower compressibility, the hardened cement can more readily distribute lateral forces or can better distribute forces in response to a compressive stress, which is very favorable to good zone isolation.

Expansion Measurements

Linear expansion of cement slurries during setting at a temperature simulating well conditions was measured in an annular expansion mold. This mold was constituted by two concentric rings, respectively with a diameter of 51 mm and 89 mm, placed between two flat disks 22 mm apart. The external ring had longitudinal slits and included two scales located either side of the slit enabling distances to be measured during expansion of the cement. The cement slurry to be studied was poured into the mold, and the mold was then placed in a water bath thermostatted at 95° C. The slurry remained in contact with the water throughout the test.

The expansion results are shown in Table 6.

TABLE 6

Expansion results

| | Linear expansion, % after 4 days | Linear expansion, % after 6 days | Linear expansion, % after 11 days |
|---|---|---|---|
| NET | 0 | 0 | 0 |
| #4 | 0.29 | 0.29 | 0.36 |

The expansion behavior is of particular interest for preventing the cement from separating from the casing and to prevent it from separating from the formation. This behavior is more significant when the cement is flexible and thus is confined by the rock.

The slurries of the invention thus prove to be well suited to cementing in zones subjected to extreme static or dynamic stresses such as perforation zones, junctions of branches of a multi-branch lateral well or salt zones necessitating large changes in mud pressure.

What is claimed is:
1. A method of cementing a zone of a well, comprising pumping into the well a cementing composition which comprises:
    (i) a hydraulic binder;
    (ii) a particulate material that has a specific gravity of greater than 3; and
    (iii) reinforcing particles which:
       comprise a flexible material;
       have a density of less than about 1.5 g/cm3;
       have a Poisson ratio of more than 0.3; and
       have an average grain size of less than about 600 $\mu$m.
2. A method as claimed in claim 1, comprising pumping the cementing composition into a perforation zone of the well.
3. A method as claimed in claim 1, comprising pumping the cementing composition into a junction of a multilateral well.
4. A method as claimed in claim 1, wherein the particulate material has a density of 4.95 g/cm$^3$.
5. A method as claimed in claim 4, wherein the particulate material comprises hematite.
6. A method as claimed in claim 1, wherein the reinforcing particles comprise rubber.
7. A method as claimed in claim 1, wherein the reinforcing particles have a Poisson ratio of less than 0.45.
8. A method as claimed in claim 7, wherein the reinforcing particles have a Poisson ratio of less than 0.4.
9. A method as claimed in claim 1, wherein the reinforcing particles have a Young's modulus of less than 5000 MPa.
10. A method as claimed in claim 9, wherein the reinforcing particles have a Young's modulus of less than 3000 MPa.
11. A method as claimed in claim 10, wherein the reinforcing particles have a Young's modulus of less than 2000 MPa.
12. A method as claimed in claim 1, wherein the reinforcing particles have an average particle size in range 80 $\mu$m to 600 $\mu$m.

13. A method as claimed in claim 12, wherein the reinforcing particles have an average particle size in the range 100 μm to 500 μm.

14. A method as claimed in claim 1, wherein the cementing composition comprises:
- 20%–45% by volume of hydraulic binder;
- 2%–15% by volume of particulate material that has a specific gravity of greater than 3;
- 5%–20% by volume of reinforcing particles; and
- 40%–50% by volume of mixing water.

15. A method as claimed in claim 1, wherein the reinforcing particles have a density of less than 1.2 g/cm$^3$.

16. A method of setting a cement plug in a well, comprising pumping into the well a cementing composition which comprises:
- (i) a hydraulic binder;
- (ii) a particulate material that has a specific gravity of greater than 3; and
- (iii) reinforcing particles which:
  - comprise a flexible material;
  - have a density of less than about 1.5 g/cm3;
  - have a Poisson ratio of more than 0.3; and
  - have an average grain size of less than about 600 μm.

* * * * *